United States Patent
Wei Yin

(10) Patent No.: US 8,810,731 B2
(45) Date of Patent: Aug. 19, 2014

(54) PHASE MOTION DETECTOR FOR BASEBAND YC SEPARATION

(71) Applicant: STMicroelectronics Asia Pacific Pte., Ltd., Singapore (SG)

(72) Inventor: Patricia Chiang Wei Yin, Singapore (SG)

(73) Assignee: STMicroelectronics Asia Pacific Pte., Ltd., Singapore (SG)

( * ) Notice: Subject to any disclaimer, the term of this patent is extended or adjusted under 35 U.S.C. 154(b) by 0 days.

(21) Appl. No.: 13/797,362

(22) Filed: Mar. 12, 2013

(65) Prior Publication Data

US 2013/0250178 A1    Sep. 26, 2013

Related U.S. Application Data

(62) Division of application No. 12/655,383, filed on Dec. 30, 2009, now Pat. No. 8,395,710.

(30) Foreign Application Priority Data

Dec. 31, 2008   (SG) ................. 200809671-1

(51) Int. Cl.
*H04N 5/14* (2006.01)
*H04N 9/64* (2006.01)
*H04N 9/78* (2006.01)

(52) U.S. Cl.
USPC .................................... 348/669; 348/666

(58) Field of Classification Search
CPC .................... H04N 9/77; H04N 9/78
USPC ............................ 348/663–670
See application file for complete search history.

(56) References Cited

U.S. PATENT DOCUMENTS

| | | | |
|---|---|---|---|
| 5,936,676 A | 8/1999 | Ledinh et al. | |
| 7,532,254 B1 * | 5/2009 | Woodall | 348/609 |
| 8,063,984 B2 | 11/2011 | Yamauchi | |
| 2006/0125966 A1 * | 6/2006 | De Haan et al. | 348/663 |

* cited by examiner

*Primary Examiner* — Michael Lee

(57) ABSTRACT

Systems and methods are disclosed herein for a motion detection system for video signal processing that includes a luminance motion detector, a chroma motion detector, and a smoothness detector. These systems and methods may also include a phase motion detector, a baseband YC separation circuitry for video signal processing, a chip for video signal processing, and a video signal processing system used in an electronic article.

20 Claims, 11 Drawing Sheets

PHASE MOTION DETECTOR FOR BASEBAND YC SEPARATION

CROSS-REFERENCE TO RELATED APPLICATION(S) AND CLAIM OF PRIORITY

This application incorporates by reference the content of U.S. patent application Ser. No. 12/655,383, filed Dec. 30, 2009, now U.S. Pat. No. 8,395,710, and Singapore Patent Application Ser. No. 200809671-1, filed Dec. 31, 2008.

TECHNICAL FIELD OF THE INVENTION

The present invention generally relates to video signal processing, and more particularly to a phase motion detector for baseband YC separation for image quality improvement.

BACKGROUND OF THE INVENTION

In composite video television systems such as NTSC and PAL, luminance and chrominance information share a portion of the total signal bandwidth. While clean separation between luminance and chrominance is highly desired, current video signal decoders misinterpret the shared luminance and chrominance information, resulting in cross color and dot crawl. Both are highly disturbing artifacts. The term "cross color" refers to corruption of the chrominance spectrum caused by the misinterpretation of high-frequency luminance information as chrominance information. Cross color manifests itself in spectrum of bright colors changing from frame to frame. Conversely, the term "dot crawl" or "cross luminance" refers to corruption of the luminance spectrum by the misinterpretation of chrominance information as high-frequency luminance information. Dot crawl manifests itself in patterned high amplitude noise.

Both artifacts can be reduced by selectively filtering video signals during signal processing. The filtering process usually employs a 3D comb filter comprising at least one line comb filter and at least one frame comb filter. A line comb filter can reduce such artifacts but its effectiveness is limited to artifacts generated by vertical edges and it has a disadvantage of decreasing the vertical resolution. A frame comb filter, on the other hand, provides maximum picture resolution but can only be applied to stationary parts of a picture. To maximize the effectiveness of the comb filters, a highly precise motion detector that can differentiate between the moving and stationary pixels is required.

Conventional arts use a low pass inter-frame difference to generate a motion map to select line comb filters when motion is detected and frame comb filters when there is no motion. Depending on the cut-off frequency of the low pass filter, the performance of the 3D comb filter varies. If the cut-off frequency is high, some motion due to cross luminance may be falsely detected and the 3D comb filter's effectiveness is reduced. If the cut-off frequency is low, motion with higher frequency content may not be detected and motion smearing results. The higher the overlapping of the chrominance with video bandwidth, the more ineffective the motion detection.

Some have improved the performance of motion detection by associating oblique correlation with likelihood of false motion. One disclosed motion detection device including an oblique correlation detection section, motion detection section and motion determination section decreases the sensitivity of motion detection in the presence of an oblique correlation. However, the implementation of the concept using decreased sensitivity in presence of oblique correlation is not sufficient because of the conflict of interests. On one hand, the decreased sensitivity may have impaired the detection of true motion for oblique objects. On the other hand, decreased sensitivity may not be sufficient to prevent false motion detection in mixed color/luminance edges since cross luminance are typically of large amplitudes.

Another example for motion detection uses a plurality of temporal pixels to determine the motion or still status of the video composite signal suitable for use in a 3D comb filter in video decoder. Yet another example for motion detection uses a motion detection circuitry with precise Y motion and C motion detection. The Y motion detection uses the frame difference of line-comb Y signal with chroma level and vertical edge consideration. The C motion detection uses the frame difference of line-comb C signal, together with the frame difference of composite signal and chroma vertical and horizontal correlation computed from the frame-comb Y signals of adjacent lines. Yet another example for motion detection uses a two-frame difference signal that has been filtered to remove chrominance information. The filtering is performed on at least one spatial axis according to the spatial correlation. Although this motion detection considers the contributions from both luminance and chroma, it does not represent the temporal difference between the frames being filtered.

FIG. 13 shows an exemplary functional block diagram of a motion detector of a conventional 3D comb filter. As to the NTSC standard, an approximate luminance data is obtained after the composite video signal has passed through a low pass filter, and a luminance data of the previous frame is obtained after the approximate luminance data has been delayed by a frame buffer for a frame time. The luminance data of the current frame is then compared with the luminance data of the previous frame so as to obtain a luminance difference. In addition, a chrominance data is obtained after the composite video signal has passed through a band pass filter and has been subtracted from the luma data. Then the chrominance data of the previous two frames is obtained after the chrominance data has been delayed by the frame buffers for two frame time. A chrominance difference is obtained after the chrominance data of the current frame is subtracted from the chrominance data of the previous two frames. A detecting circuit calculates a motion factor by selecting a number which is bigger between the luminance difference and the chrominance difference.

Generally, these methods do not consider motion contributed by chroma component because of interfering high frequency luminance at chroma band. However, certain types of motion exist with purely color motion and a misdetection results in color smearing.

Hence, there is a need to detect true luminance and chroma motions, especially chroma-only motion and high frequency luminance motion. Furthermore, the motion detection problem in baseband is more challenging than in composite domain in that there are 3 corrupted component inputs not guaranteed to be generated by complementary decoders.

SUMMARY

In one embodiment of the present disclosure, there is provided a motion detection system that detects all types of motions including high frequency luminance motion and chroma motion independent of other signal processing. The motion detection system may comprises a luminance motion detector detecting the low frequency luminance changes, a chrominance motion detector for detecting the chroma changes, and a smoothness detector detecting the flat regions in chroma component. These systems and methods may further comprise a phase motion detector detecting the high frequency luminance and chroma changes and outputting the results of the detection into a video processing unit or other device.

Other technical features may be readily apparent to one skilled in the art from the following figures, descriptions, and claims.

BRIEF DESCRIPTION OF THE DRAWINGS

Preferred embodiments according to the present disclosure will now be described with reference to the Figures, in which like reference numerals denote like elements.

DETAILED DESCRIPTION OF EXEMPLARY EMBODIMENTS

The present disclosure may be understood more readily by reference to the following detailed description of certain embodiments of the disclosure. Throughout this disclosure, where publications are referenced, the disclosures of these publications are hereby incorporated by reference in their entireties into this application in order to more fully describe the state of art to which this disclosure pertains.

While embodiments of the present disclosure will be described in reference to the accompanying drawings, the specifics and details are provided for the sole purpose of illustrating selected embodiments of the present disclosure. It is to be appreciated that the present disclosure may be practiced without employing the specifics and details. Furthermore, certain variations of the specifics and details in the practice are permissible without deviation from the scope of the appended claims.

Figure 1:
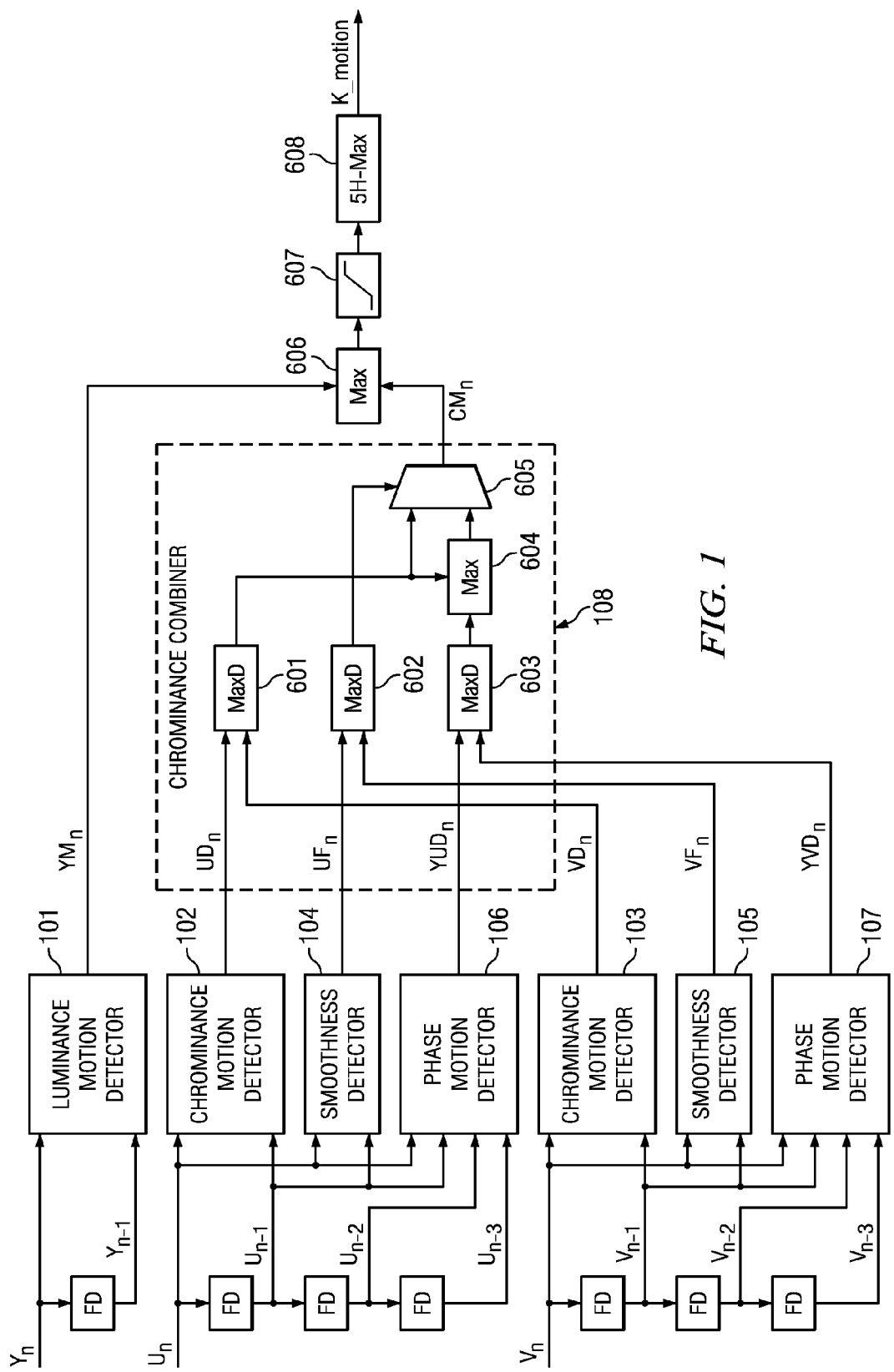
FIG. 1 is a functional block diagram of the circuitry of the motion detection system for the NTSC standard in accordance with one embodiment of the present disclosure.

As illustrated in FIG. 1, there is provided a functional block diagram of the circuitry of the motion detection system for the NTSC standard in accordance with one embodiment of the present disclosure. The motion detection system 100 comprises a luminance motion detector 101 that detects low frequency luminance motion between frame n and n−1; chrominance motion detectors 102/103 that detect U and V chroma motion between frame n and n−1 respectively; smoothness detectors 104/105 that detect presence of luminance residue on U and V chroma components in frame n and n−1 respectively; phase motion detectors 106 and 107 that detect average luminance and chroma motion between frames n, n−1, n−2 and n−3; and chroma motion combiner 108 that integrates the motions derived from U and V components. The motion detection system 100 further comprise a Max 606, a saturation circuit 607, and a 5H-max circuit 608, which functions will be described in detail hereinafter. The saturation circuits clip an input signal to a defined output range, and the 5H-max circuit chooses the maximum value of 5 consecutive pixels in a horizontal window.

Figure 2:
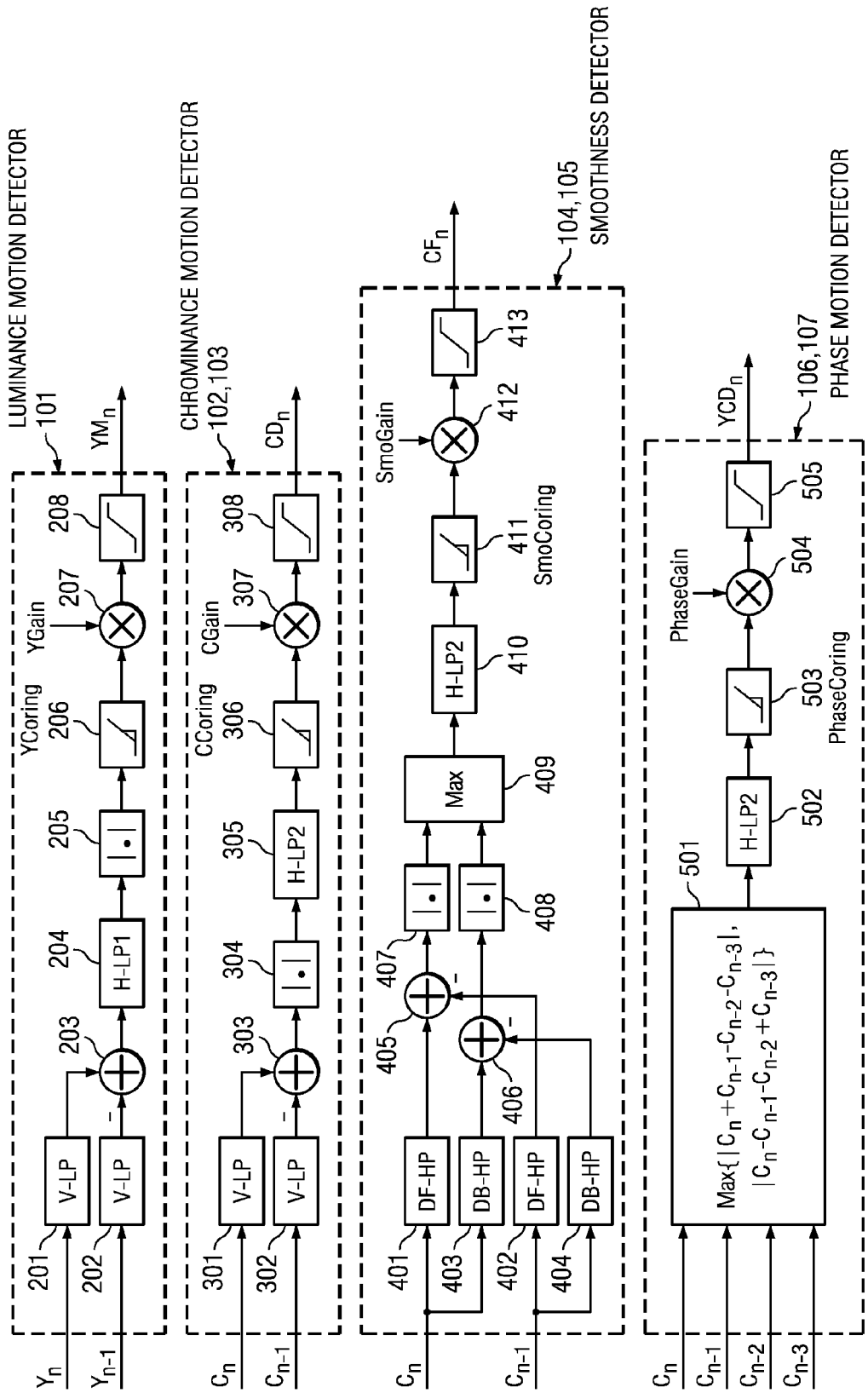
FIG. 2 shows exemplary electric circuitries for the luminance motion detector 101, the chrominance motion detectors 102/103, the smoothness detectors 104/105, and the phase motion detectors 106/107 in accordance with one embodiment of the present disclosure.

With reference to FIG. 2, there are provided exemplary electric circuitries for the luminance motion detector 101, the chrominance motion detectors 102/103, the smoothness detectors 104/105, and the phase motion detectors 106/107 in accordance with one embodiment of the present disclosure.

The luminance motion detector 101 detects precisely changes in the luminance component between frame n and frame n−1 used for the frame comb in NTSC standard. The input signal is vertically filtered to remove chroma residue, to present the best-case line-comb Y signal for difference computation. The output signal is low-pass filtered to eliminate the possibility of chroma component corruption at high frequency.

The luminance motion detector 101 receives three line signals from each of the current frame n and the previous frame n−1. For the current frame n, the three line signals are the next line signal $Y_{m+1,n}$, current line signal $Y_{m,n}$, previous line signal $Y_{m-1,n}$ via two luminance line delay memories, where m denotes the line number. A vertical low pass filter 201 with coefficients [1 2 1]/4 is used to cancel out-of-phase chroma signal to generate line-comb signal $YLC_n$. Concurrently, the luminance motion detector 101 also receives three line signals from the previous frame n−1: next line signal $Y_{m+1,n-1}$, current line signal $Y_{m,n-1}$ and previous line signal $Y_{m-1,n-1}$, via one luminance frame delay memory and two additional luminance line delay memories. Similarly, a vertical low pass filter 202 is used to generate line-comb signal $YLC_{n-1}$. The line-comb signals $YLC_n$ and $YLC_{n-1}$ may alternatively be the output of line combs of the baseband circuitry.

These line-comb signals $YLC_n$ and $YLC_{n-1}$ are then subtracted by a subtractor 203. A horizontal low pass filter 204, with low pass frequency characteristics not exceeding the lower end of the overlapping frequency band of chroma and luminance signal or band-stop frequency characteristics covering the chroma band, subsequently filters the line-comb signal differences to exclude possible interference of chroma residue. The magnitude is extracted by an absolute circuit 205 and passed through a coring circuit 206 to eliminate possible noise interference. Finally, the magnitude is multiplied by a multiplier 207 with gain, YGain (G1), and clipped by a saturation circuit 208 to appropriate motion range to generate low frequency luminance motion YMn.

The chroma motion detectors 102/103 detect precisely changes in the chroma components between frame n and frame n−1 used for frame comb in NTSC standard. The input signal is vertically filtered to remove luminance residue, to present best case line-comb C signal for difference computation. While each chroma component U or V is processed independently by the chrominance motion detectors 102/103 to generate chroma motions UD and VD, the operations for each chroma component are the same; thus for the sake of convenience, CD is used to refer inter-changeably to either UD or VD in this document.

Similar to the luminance motion detector 101, the chrominance motion detector 102/103 receives three line signals from each of the current frame n and previous frame n−1. For the current frame n, the three line signals are next line signal $C_{m+1,n}$, current line signal $C_{m,n}$, previous line signal $C_{m-1,n}$ via 2 chroma line delay memories. A vertical low pass filter 301 with coefficients [1 2 1]/4 is used to cancel out-of-phase luminance signal to generate line-comb signal, $CLC_n$. Concurrently, the chrominance motion detector 102/103 receives three line signals from the previous frame n−1: next line signal $C_{m+1,n-1}$, current line signal $C_{m,n-1}$, and previous line signal $C_{m-1,n-1}$ received via one chroma frame delay memory and two chroma line delay memories. The line signals are vertically filtered by a vertical low pass filter 302 to generate line-comb signal, $CLC_{n-1}$. The signals $CLC_n$ and $CLC_{n-1}$ may be the output of line combs in a baseband circuitry discussed in detail hereinafter.

These line-comb signals $CLC_n$ and $CLC_{n-1}$ are then subtracted by a subtractor 303. Its magnitude is extracted by an absolute circuit 304 to generate intermediate chroma motion $CD_p$, low pass filtered by a horizontal low pass filter 305 to smoothen transitions, and passed through a coring circuit 306 to eliminate possible noise interference. Finally, the magnitude is multiplied by a multiplier 307 with gain, CGAIN (G2), and clipped by a saturation circuit 308 to appropriate motion range to generate chroma motion CD.

The smoothness detector 104/105 detects the presence of luminance residue in chroma components. The detector uses a constructive phase-subtraction diagonally within field and temporally between frame n and frame n−1 used for frame comb in NTSC standard. A null output indicates flat region and accuracy of the chroma motion detector 102/103. While each chroma component U or V is processed independently by smoothness detector to generate high frequency signal UF and VF, the operations for each chroma component are the same; thus for the sake of convenience, CF shall refer interchangeably to either UF or VF in this document.

As the chroma motion may be influenced by luminance residue in chroma signal, it is desirable to differentiate between true and false chroma motion. The smoothness detectors 104/105 detect the presence of luminance residue and invalidate or override the output of respective chrominance motion detectors. The smoothness detectors 104/105 receive the same input as the chrominance motion detector 102/103: next line signal $C_{m+1,n}$, current line signal $C_{m,n}$, and previous line signal $C_{m-1,n}$ for current frame n; next line signal $C_{m+1,n-1}$, current line signal $C_{m,n-1}$, and previous line signal $C_{m-1,n-1}$ for previous frame n−1.

The smoothness detectors 104/105 include both forward and backward diagonal contributions. The line signals of current and previous frames are diagonally filtered by forward diagonal high pass filters 401/402, and backward diagonal high pass filters 403/404 with common coefficients [−1 2 −1]/4. The input vector for forward diagonal contribution is $[C_{x-1,m+1}\ C_{x,m}\ C_{x+1,m-1}]$ while the input vector for backward diagonal contribution is $[C_{x-1,m-1}\ C_{x,m}\ C_{x+1,m+1}]$ where x is the horizontal position of the pixel. The forward diagonally filtered signals are subtracted by a subtractor 405 and its magnitude is extracted by an absolute circuit 407. The backward diagonally filtered signals are subtracted by a subtractor 406 and its magnitude is extracted by an absolute circuit 408. A max circuit 409 selects the maximum of the forward or backward contribution to generate an intermediate high frequency signal $CF_p$. The $CF_p$ is filtered by a horizontal low pass filter 410 to smooth transitions and then cored by a coring circuit 411 to eliminate small noise. A gain SmoGain (G3) via a multiplier 412 is multiplied to the filtered output, and the signal is clipped by a saturation circuit 413 to generate high frequency signal CF. Alternatively, circuits 410-413 may be replaced by binary thresholding circuit to output 0 in presence of flat region and 1 in presence of luminance residue.

The phase motion detectors 106/107 detect the luminance and chroma changes from the temporally co-located pixels in chroma components. The changes are made independent of luminance residue in chroma by considering the phase relationship of the interleave signal. Chroma pixels from current frame $n(C_n)$, and three previous frames n−1 ($C_n$−1), n−2 ($C_n$−2), and n−3 ($C_n$−3) in NTSC standard are used to determine motion according to the following equation (1):

$$YCD = \text{Max}\{|C_n + C_{n-1} - C_{n-2} - C_{n-3}|, |C_n - C_{n-1} - C_{n-2} + C_{n-3}|\} \quad (1)$$

From one perspective, the first component gives the average chroma motion between frame n and n−2 while the second component measures the average luminance motion between frame n and n−2. From another perspective, the first component gives the difference in luminance motion between frame n and n−1 and frame n−2 and n−3 while the second component gives the difference in chroma motion between frame n and n−1 and frame n−2 and n−3.

While each chroma component U or V is processed independently by the phase motion detectors 106/107 to generate YC motion signal YUD and YVD, the operations for each chroma component are the same; thus for the sake of convenience, YCD shall refer inter-changeably to either YUD or YVD in this document.

The phase motion detectors 106/107 detect mainly chroma motion in the presence of luminance residue and high frequency luminance motion. The phase motion detectors 106/107 receive the current frame signal, $C_{m,n}$, and a plurality of previous frame signals $C_{m,n-1}$, $C_{m,n-2}$, and $C_{m,n-3}$, via three chroma frame delay memories. Then the intermediate motion values $YCD_p$ is computed via a circuit 501 according to the equation (2) below:

$$YCD_p = \text{Max}\{C_{m,n} + C_{m,n-1} - C_{m,n-2} - C_{m,n-3}|, |C_{m,n} - C_{m,n-1} - C_{m,n-2} + C_{m,n-3}|\} \quad (2)$$

The motion values may be smoothed by a horizontal low pass filter 502 and cored through a coring circuit 503. It may be scaled by gain PhaseGain (G4) via a multiplier 504 and clipped by a saturation circuit 505 to generate YC motion signal, YCD. The same phase motion detector 106/107 may be applied on the luminance component to generate YC motion values according to the equation (3) below.

$$YCD_p = \text{Max}\{|Y_{m,n} + Y_{m,n-1} - Y_{m,n-2} - Y_{m,n-3}|, |Y_{m,n} - Y_{m,n-1} - Y_{m,n-2} + Y_{m,n-3}|\} \quad (3)$$

In this case, the phase motion detector can complement detection of high frequency luminance that may not be present as luminance residue in chroma signal. As each of the above detectors has its advantages and limitations, they are combined constructively to give measures of motion between the frames to be filtered. Now referring back to FIG. 1, the chroma combiner 108 combines results from independent detectors with U or V inputs. In the case of 4:2:2 sampling format, the samples of independent chroma is half that of luminance. The maximum chroma motion UD and VD is taken and duplicated corresponding to 2 luminance samples by a maxD circuit 601 to give C2D. Similarly, the maximum high frequency signal UF and VF is taken and duplicated by a maxD circuit 602 to give C2F and the maximum YC motion YUD and YVD is taken and duplicated by a maxD circuit 603 to give YC2D. Thus, the duplicated signals have the same sample rate as luminance motion.

To suppress false chroma motion detected from luminance interference or temporally averaged motion, signals C2D and YC2D pass through a max circuit 604. The output is further modified by a selector 605. Output from the max circuit 604 is selected when flat chroma region is detected or C2F=0 and signal YC2D is selected in presence of luminance residue or C2F ≠0 to give signal CM. This compensates for undetected chroma motion by phase motion detector due to averaging effect in phase motion detector.

The final motion value, K_motion, is derived as the maximum 606 between the motion detected from luminance YM and motion detected from chrominance CM, clipped by a saturation circuit 607, and further processed as the maximum in a 5-pixel horizontal window by 5H-max circuit 608.

Figure 3:
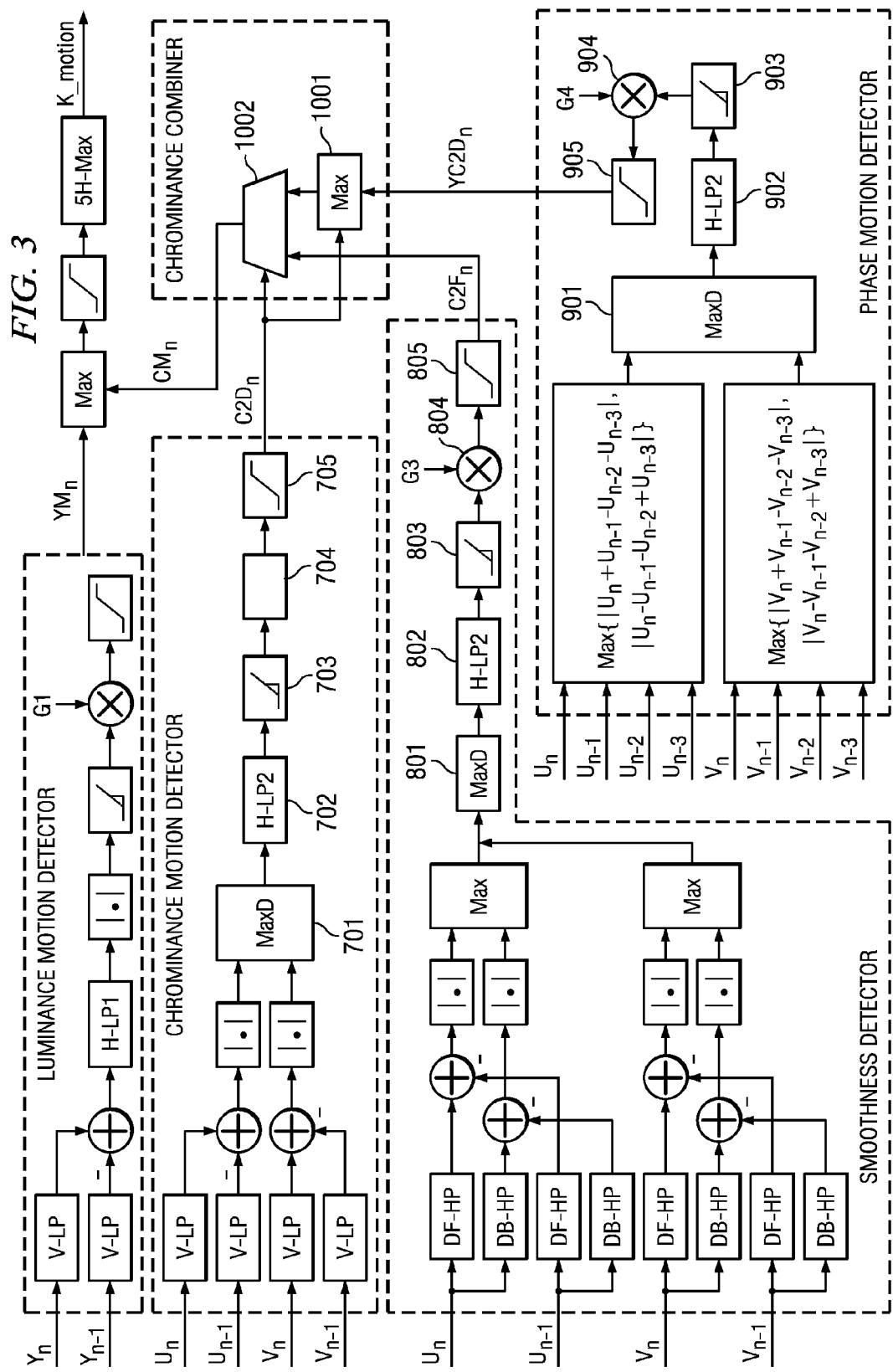
FIG. 3 shows an exemplary circuitry of the motion detector for NTSC standard in accordance with another embodiment of the present disclosure.

Referring to FIG. 3, there is provided an exemplary circuitry of the motion detection system for NTSC standard in accordance with another embodiment of the present disclosure. Instead of combining the outputs of U and V detectors in the chroma combiner 108 as shown in FIG. 1, the intermediate output signals are combined before the filtering, coring, scaling and saturation processes. Intermediate chroma motions UDp and VDp are generated as before and combined either by simply interleaving UV or taking the maximum of UV and duplicating result via a maxD circuit 701. The intermediate signal, C2Dp, is passed through a horizontal low pass filter 702, coring circuit 703, scaling circuit 704 and saturation circuit 705 to generate combined chroma motion C2D.

Intermediate chroma high frequency signals $UF_P$ and $VF_P$, are generated via plurality of diagonal filters and subsequently combined either by simply interleaving UV or taking the maximum of UV and duplicating result via a maxD circuit 801. The intermediate signal, $C2F_P$, is passed through a horizontal low pass filter 802, coring circuit 803, scaling circuit 804 and saturation circuit 805 to generate combined high frequency signal C2F. Alternatively, signal C2Fp may be binary thresholded to output C2F=0 in presence of flat region and C2F–X in presence of luminance residue.

Likewise, intermediate YC motion signals YUDp and YVDp are generated through an arithmetic circuit 901 and combined either by UV interleaving or duplicating maxd motion by the circuit 901. The output signal $YC2D_p$ that is subsequently processed by a horizontal low pass filter 902, coring circuit 903, scaling circuit 904 and saturation circuit 905 to generate combined YC motion signal YC2D.

The various signals C2D, C2F and YC2D are combined through a selector circuit 1002 that selects YC2D when luminance residue is detected or the maximum of C2D and YC2D via a max circuit 1001 when flat chroma region is detected, according to control signal C2F.

Figure 4:
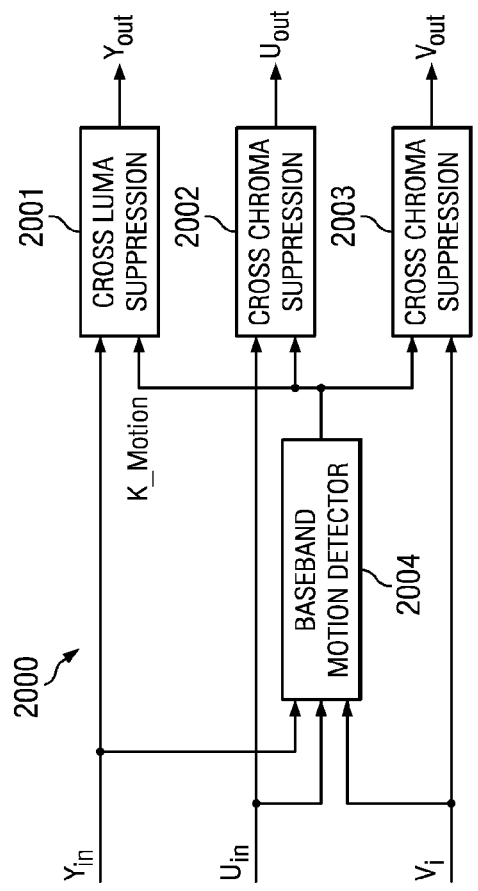
FIG. 4 is a functional block diagram showing a baseband YC separation circuitry in accordance with one embodiment of the present disclosure.

Referring to FIG. 4, there is provided a functional block diagram showing a baseband YC separation circuitry in accordance with one embodiment of the present disclosure. As shown in FIG. 4, the baseband YC separation circuitry 2000 comprises a cross luminance suppression circuit 2001 that suppresses dot crawl artifacts or chroma residue present in Y signal, a cross chroma (U) suppression circuit 2002 that suppresses cross colour artifacts or luminance residue present in U signals, a cross chroma (V) suppression circuit 2003 that suppresses cross colour artifacts or luminance residue present in V signals, and a baseband motion detector 2004 that differentiate between the moving and the stationary pixels such that the optimum comb filter can be selected to maximize effectiveness of YC separation. The baseband YC separation circuitry 2000 receives $Y_{in}$, $U_{in}$ and $V_{in}$ input signals separately and outputs the clean $Y_{out}$, $U_{out}$ and $V_{out}$ signals. The operation of such a baseband motion detector 2004 has been described above.

Figure 5:
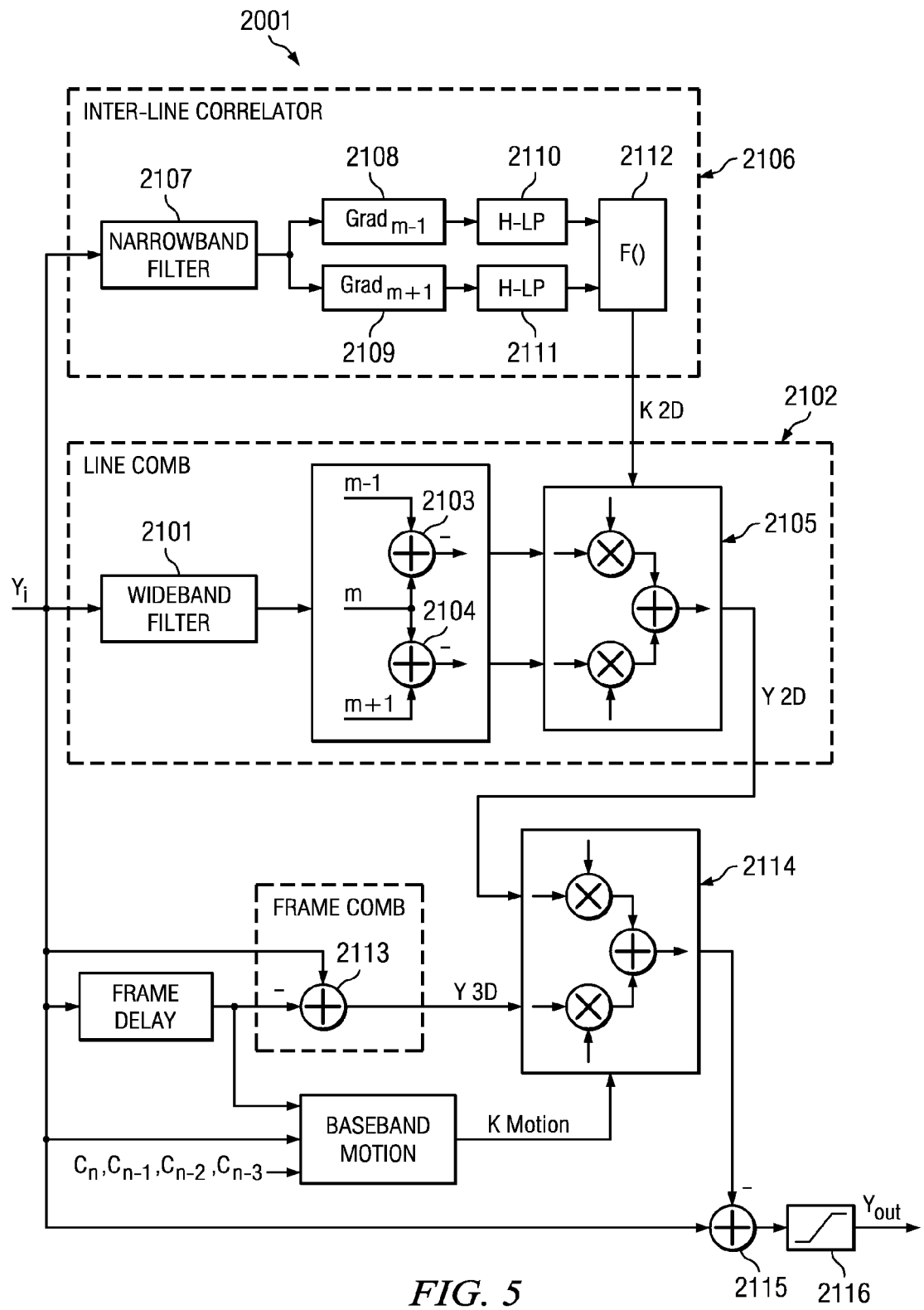
FIG. 5 shows an exemplary circuit of the cross luminance suppression circuit 2001 for the NTSC standard in accordance with one embodiment of the present disclosure.

Referring to FIG. 5, there is provided an exemplary circuit of the cross luminance suppression circuit 2001 for the NTSC standard in accordance with one embodiment of the present disclosure. A wideband filter 2101 with frequency response modeling the chroma band in composite signal and complementary to the horizontal filter 204 shown in FIG. 1 filters out the low and high frequency signal and retains only the frequency band with interleave Y and C signal. The line comb 2102 removes the redundant chroma residue from the Y signal. It has a 3 line input, next line $Y_{m+1,n,wbp}$, current line $Y_{m,n,wbp}$ and previous line $Y_{m-1,n,wbp}$. The inter-line differences are computed by subtractors 2103 and 2104 and subsequently mixed by a mixer 2105 corresponding to K_2D signal from the inter-line correlator 2106 described hereinafter.

The inter-line correlator 2106 detects the relative chroma correlation between the current and next line and current and previous line, such that the line comb does not filter across contrasting colour regions. The Y signal passes through the narrowband filter 2107 to isolate the sub-band of the YC interleave frequency band. The narrowband filter has a smaller bandwidth centered at chroma subcarrier frequency of 3.58 MHz compared to the wideband filter for purposes of less interference from luminance signal. The gradients of current and next line, $G_{x,m,m+1}$, and current and previous line, $G_{x,m,m-1}$ are computed in gradient circuits 2108 and 2109 using band-passed Y signal represented by Y for simplicity according to the following equations (4-5) or (6-7).

$$G_{x,m,m+1} = \min\{\max\{|Y_{x,m+1}-Y_{x+2,m}|, |Y_{x+2,m+1}-Y_{x,m}|\}, \max\{|Y_{x,m+1}-Y_{x-2,m}|, |Y_{x-2,m+1}-Y_{x,m}|\}\} \quad (4)$$

$$G_{x,m,m-1} = \min\{\max\{|Y_{x,m-1}-Y_{x+2,m}|, |Y_{x+2,m-1}-Y_{x,m}|\}, \max\{|Y_{x,m-1}-Y_{x-2,m}|, |Y_{x-2,m-1}-Y_{x,m}|\}\} \quad (5)$$

$$G_{x,m,m+1} = \{\max\{|Y_{x+1,m+1}-Y_{x-1,m}|, |Y_{x-1,m+1}-Y_{x+1,m}|\}\} \quad (6)$$

$$G_{x,m,m-1} = \{\max\{|Y_{x+1,m-1}-Y_{x-1,m}|, |Y_{x-1,m-1}-Y_{x+1,m}|\}\} \quad (7)$$

They are subsequently filtered by horizontal low pass filters 2110 and 2111 for continuity. The lower the gradient, the higher the correlation, meaning a higher possibility that the pixels from the two lines belong to the same colour region. Thus line-comb output from two lines having a lower gradient should have a higher contribution towards the final comb value. K_2D is defined as the weight for the line comb filter between the current and previous line in the function circuit 2112. K_2D is represented by the equation (8) below.

$$K\_2D = (G'_{m,m+1})/(G'_{m,m+1}+G'_{m,m-1}) \quad (8)$$

Alternatively, K_2D can be obtained from the K_2D values generated by the cross chroma suppression circuits 2002 and 2003. An example method of combining may be represented by the equation (9) below:

$$K\_2D = (GU'_{m,m+1} + GV'_{m,m+1})/(GU'_{m,m+1} + GV'_{m,m+1} + GU'_{m,m-1} + GV'_{m,m-1}) \quad (9)$$

where $GU'_{m,m+1}$ represents the low pass filtered gradient between the current and next line for chroma signal U, $GV'_{m,m+1}$ represents the low pass filtered gradient between the current and next line for chroma signal V, $GU'_{m,m-1}$ represents the low pass filtered gradient between the current and previous line for chroma signal U, and $GV'_{m,m-1}$ represents the low pass filtered gradient between the current and previous line for chroma signal V.

The output of the line comb filter can be expressed according to the equation (10) below:

$$Y\_2D = K\_2D*(Y_m - Y_{m-1}) + (1 - K\_2D)*(Y_m - Y_{m+1}) \quad (10)$$

The frame comb subtracts the previous frame signal $Y_{m,n}$ from the current frame signal $Y_m$, using subtractor 2113 to generate frame comb output Y_3D.

The residual chroma signal is extracted via a mixer circuit 2114 using motion value, K_motion from the baseband motion detector 2004 and the final clean luminance signal, $Y_{out}$ is generated according to the equation (11) below by subtracting the residual chroma signal from input luminance signal, $Y_{in}$, with a subtractor 2115 and clipping the output to defined pixel range with a saturation circuit 2116.

$$Y_{out} = Y_m - (K\_motion * Y\_2D + (1 - K\_motion) * Y3D) \quad (11)$$

Figure 6:
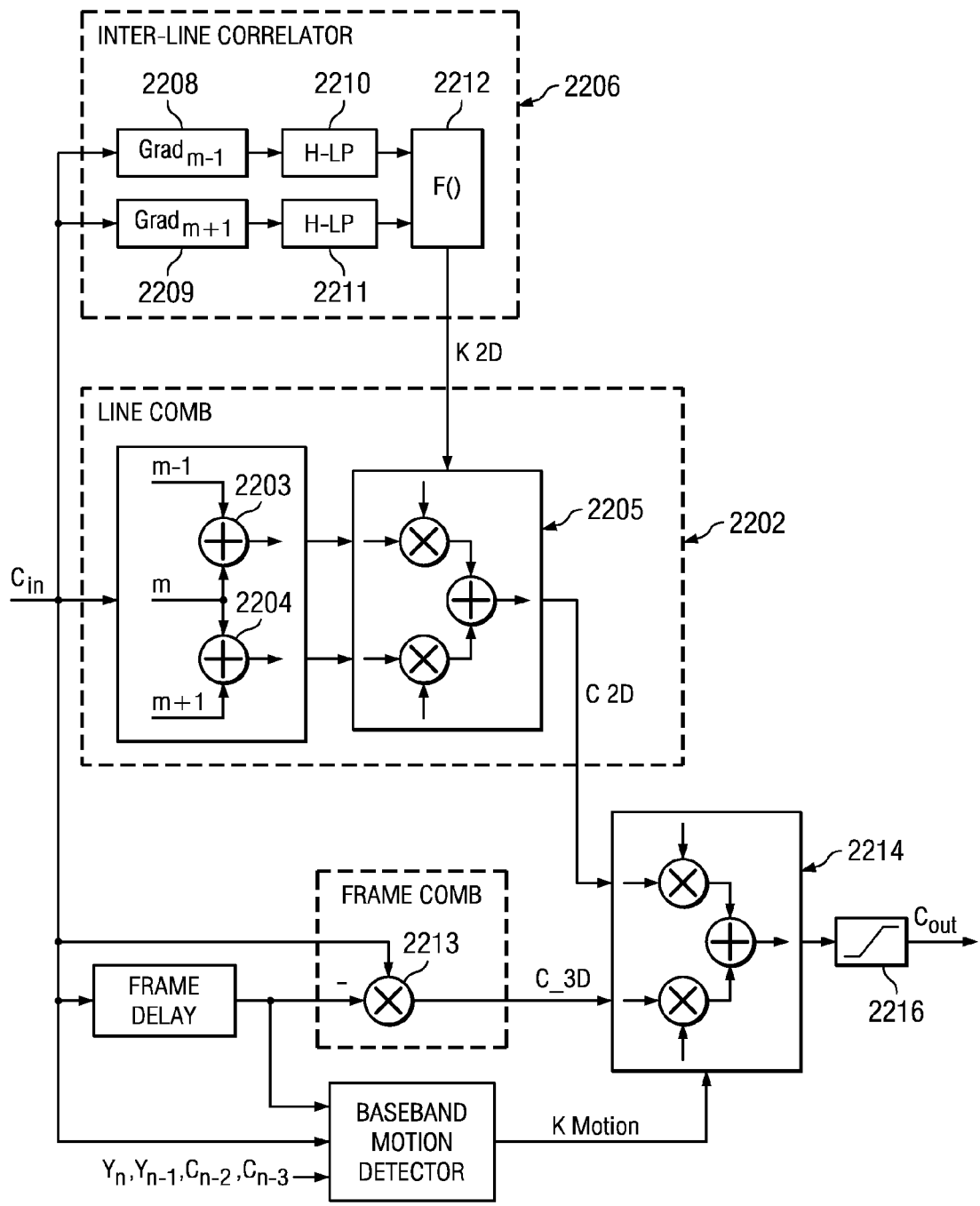
FIG. 6, there is provided an exemplary circuit of the cross chroma suppression circuits 2002/2003 in accordance with one embodiment of the present disclosure.

Referring to FIG. 6, there is provided an exemplary circuitry of the cross chroma suppression circuits 2002/2003 in accordance with one embodiment of the present disclosure. The architecture of the cross chroma suppression circuit is almost similar to the cross luminance suppression circuit. The differences are the absence of the wideband filter for line comb and narrowband filter for inter-line correlator.

The chroma line comb 2202 removes the redundant luminance residue from the Uin or Vin signal. Signal C shall be referring to either signal U or V for the cross chroma suppression circuit. It has a three line input, next line $C_{m+1,n,wbp}$ current line $C_{m,n,wbp}$ and previous line $C_{m-1,n,wbp}$. The inter-line differences are computed by subtractors 2203 and 2204 and subsequently mixed by a mixer 2205 corresponding to K_2D signal from the inter-line correlator 2206.

The inter-line correlator 2206 detects the relative chroma correlation between the current and next line and current and previous line, such that the chroma line comb does not filter across contrasting colour regions. A low pass filter can be applied prior to gradient computation to exclude influence of luminance on chroma signal. The gradients of current and next line, $G_{x,m,m+1}$, and current and previous line, $G_{x,m,m-1}$, are computed in gradient circuits 2208 and 2209 according to the equations (12) and (13) below.

$$G_{x,m,m+1} = \min\{\max\{|C_{x,m+1} - C_{x+1,m}|, |C_{x+1,m+1} - C_{x,m}|\}, \max\{|C_{x,m+1} - C_{x-1,m}|, |C_{x-1,m+1} - C_{x,m}|\}\} \quad (12)$$

$$G_{x,m,m-1} = \min\{\max\{|C_{x,m-1} - C_{x+1,m}|, |C_{x+1,m-1} - C_{x,m}|\}, \max\{|C_{x,m-1} - C_{x-1,m}|, |C_{x-1,m-1} - C_{x,m}|\}\} \quad (13)$$

They are subsequently filtered by horizontal low pass filters 2210 and 2211. The lower the gradient, the higher the correlation, meaning a higher possibility that the pixels from the two lines belong to the same colour region. Thus line-comb output from two lines having a lower gradient should have a higher contribution towards the final comb value. K_2D is defined as the weight for the line comb filter between the current and previous chroma line in the function circuit 2212. K_2D is represented by the equation (14) below.

$$K\_2D = (G'_{m,m+1})/(G'_{m,m+1} + G'_{m,m-1}) \quad (14)$$

K_2D from the cross chroma suppression circuits 2002 and 2003 can be combined using a max function and upsampled by two or interleaved to provide the K_2D for the cross luminance suppression circuit 2001.

The output of the line comb filter can be expressed by the equation (15) below.

$$C\_2D = K\_2D*(C_m - C_{m-1}) + (1 - K\_2D)*(C_m - C_{m+1}) \quad (15)$$

The frame comb adds the previous frame signal $C_{m,n-1}$ from the current frame signal $C_{m,n}$ using an adder 2213 to generate frame comb output C 3D.

The final 3D value, $C_{out}$ is generated via a mixer circuit 2214 using motion value, Kmotion from the baseband motion detector 2004 and clipped to valid pixel range with a saturation circuit 2216. $C_{out}$ can be represented by the equation (16) below.

$$C_{out} = K\_motion * C\_2D + (1 - K\_motion) * C\_3D \quad (16)$$

Figure 7:
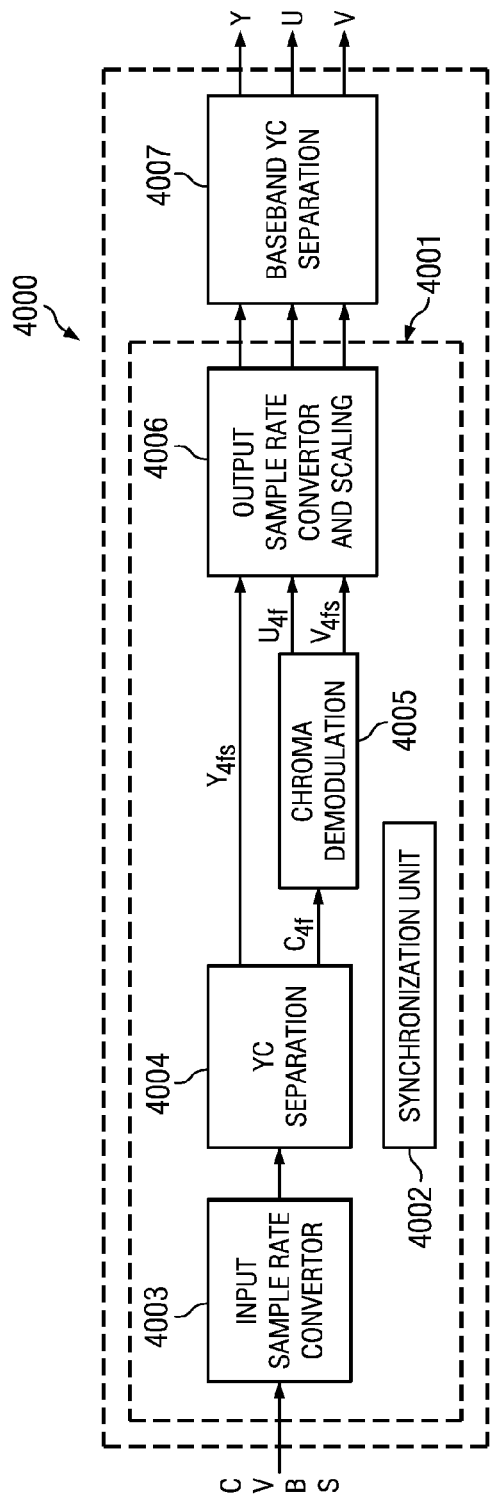
FIG. 7 is a functional block diagram of a video signal processing system in accordance with one embodiment of the present disclosure.

Referring to FIG. 7, there is provided a functional block diagram of a video signal processing system in accordance with one embodiment of the present disclosure. The signal processing system 4000 comprises a front end digital decoder 4001 and a baseband YC separation module 4007. The front end digital decoder 4001 decodes the composite input signals to generate component Y, U and V signals. The decoder 4001 comprises a synchronization unit 4002 to capture the video synchronization signals and to lock the system clock to the frequency and phase of the incoming signal using the chroma burst, an input sample rate converter 4003 to re-sample the acquisition sample rate of 27 MHz to four times the subcarrier frequency, a YC separation circuit 4004 to separate chroma and luminance signal from the composite signal, a chroma demodulator 4005 to demodulate the chroma signal according chroma phase lock loop, an output sample rate convertor and scaler 4006 to re-sample the separated signals to output sampling rate domain and to scale the video signal to required dynamics.

The component signals from the decoder 4001 are input to the baseband YC separation circuit 4007 for further 3D comb filtering. The baseband YC separation circuit 4007 as described above is a second separation circuit in the signal processing system to compensate for inefficiency of the first separation circuit 4004 and to eliminate residual cross component signals. As such, the operation of the first separation circuit 4004 in composite domain may be simplified. In one embodiment, the baseband YC separation circuit 4007 may be a 3D comb filter using a mix of frame comb and line comb controlled by a motion detector. In another embodiment, the baseband YC separation circuit 4007 may be a 2D comb filter with a 3-line comb controlled by an inter-line correlator. In another embodiment, the baseband YC separation circuit 4007 may be a set of complementary or non-complementary filters around the chroma subcarrier frequency with band-stop or notch filter for the Y output and band-pass filter for the C output. In yet another embodiment, the input is bypassed for the Y output and band-pass filtered for the C output. The baseband YC separation circuit should operate independent of the front-end separation circuitry and the motion detector should perform precise motion detection regardless of source input.

Figure 8:
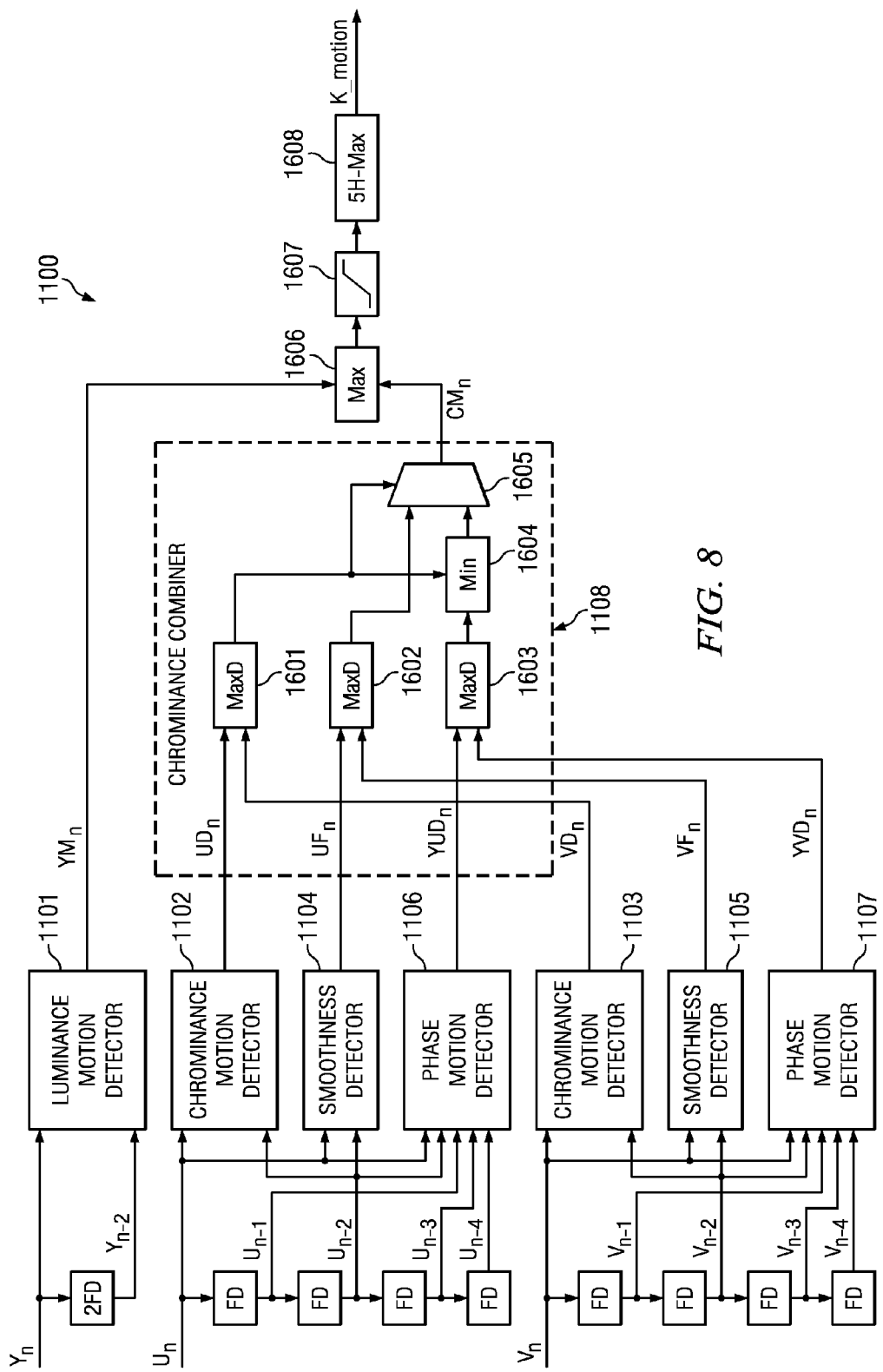
FIG. 8 is a functional block diagram of the circuitry of the motion detection system for the PAL standard in accordance with one embodiment of the present disclosure.

Now there is provided a detailed description of the motion detection system and baseband YC separation circuitry and signal processing system for PAL standard. Referring to FIG. 8, there is provided a functional block diagram of the circuitry of the motion detection system for the PAL standard in accordance with one embodiment of the present disclosure. As shown in FIG. 8, the motion detection system 1100 comprises a luminance motion detector 1101 that detects low frequency luminance motion between frames n and n−2; chrominance motion detectors 1102 and 1103 that detect U and V chroma motion between frames n and n−2; smoothness detectors 1104 and 1105 that detect presence of luminance residue on U and V chroma components in frames n and n−2; phase motion detectors 1106 and 1107 that detect average luminance and chroma motion between frames n, n−2, n−3, n−4 and n−5; and a chroma motion combiner 1108 that integrates the motion derived from U and V components. The motion detection system 1100 further comprises a max circuit 1606, a saturation circuit 1607, and a 5H-max circuit 1608, which functions will be described hereinafter.

The motion detector system 1100 for the PAL standard has a similar architecture of the motion detector system 100 for the NTSC standard. But the motion detector system 1100 uses previous frame n−2 instead of n−1, previous line signals $Y_{m-2,n}$, $C_{m-2,n}$ instead of $Y_{m-1,n}$, $C_{m-1,n}$ and next line signals $Y_{m+2,n}$, $C_{m+2,n}$ instead of $Y_{m+1,n}$, $C_{m+1,n}$ for luminance motion detector, chrominance motion detectors and smoothness detectors and computation specific to phase relationships of the standard in phase motion detector.

Figure 9:
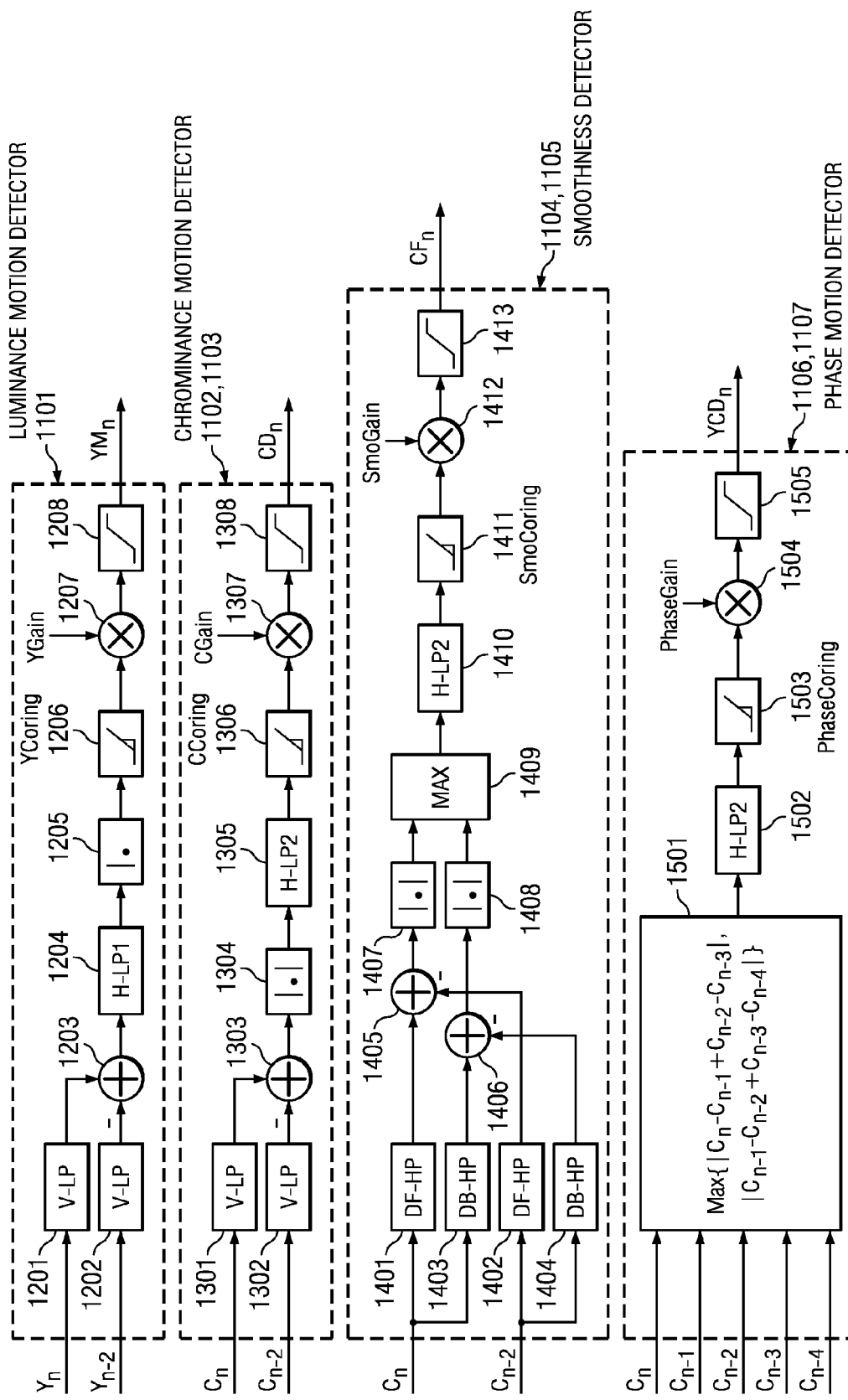
FIG. 9 shows exemplary electric circuitries for the luminance motion detector 1101, the chrominance motion detectors 1102/1103, the smoothness detectors 1104/1105, and the phase motion detectors 1106/1107 in accordance with one embodiment of the present disclosure.

Referring FIG. 9, there are provided exemplary electric circuitries for the luminance motion detector 1101, the chrominance motion detectors 1102/1103, the smoothness detectors 1104/1105, and the phase motion detectors 1106/1107 in accordance with one embodiment of the present disclosure.

The luminance motion detector 1101 receives three line signals from each of the current frame n and previous frame n−2. For the current frame n, the three line signals include the next line signal $Y_{m+2,n}$, current line signal $Y_{m,n}$, previous line signal $Y_{m-2,n}$ via 4 luminance line delay memories. A vertical low pass filtering 1201 with coefficients [1 2 1]/4 is performed to cancel out-of-phase chroma signal to generate line-comb signal $YLC_n$. Concurrently, for the previous frame n−2, the three line signals include the next line signal $Y_{m+2,n-2}$, current line signal $Y_{m,n-2}$ and previous line signal $Y_{m-2,n-2}$, via two luminance frame delay memories and four additional luminance line delay memories. Similarly, a vertical low pass filtering 1202 is performed to generate line-comb signal $YLC_{n-2}$. The line-comb signals $YLC_n$ and $YLC_{n-2}$ may alternatively be the output of line combs of the baseband circuitry.

These line-comb signals $YLC_n$ and $YLC_{n-2}$ are then subtracted by a subtractor 1203. The horizontal low pass filter 1204, with low pass frequency characteristics not exceeding the lower end of the overlapping frequency band of chroma and luminance signal or band-stop frequency characteristics covering the chroma band, subsequently filters the line-comb signal differences to exclude possible interference of chroma residue. The magnitude is extracted by absolute circuit 1205 and passed through coring circuit 1206 to eliminate possible noise interference. Finally, it is multiplied by gain, YGain (GJ) via multiplier 1207 and clipped by saturation circuit 1208 to appropriate motion range to generate low frequency luminance motion YM.

Similar to the luminance motion detector 1101, the chrominance motion detector 1102/1103 receives three line signals from each of the current frame n and previous frame n−2. For the current frame n, the three line signals include the next line signal $C_{m+2,n}$, current line signal $C_{m,n}$, previous line signal $C_{m-2,n}$ via four chroma line delay memories. A vertical low pass filter 1301 with coefficients [1 2 1]/4 is used to cancel out-of-phase luminance signal to generate line-comb signal, $CLC_n$. Concurrently, for the previous frame n−2, the three line signals include the next line signal $C_{m+2,n-2}$, current line signal $C_{m,n-2}$, previous line signal $C_{m-2,n-2}$, received via two chroma frame delay memories and four chroma line delay memories, which are vertically filtered by a vertical low pass filter 1302 to generate line-comb signal $CLC_{n-2}$. The signals $CLC_n$ and $CLC_{n-2}$ may be from the output of line combs in a baseband circuitry described in detail hereinafter.

These line-comb signals $CLC_n$ and $CLC_{n-2}$ are then subtracted by a subtractor 1303. Its magnitude is extracted by an absolute circuit 1304 to generate intermediate chroma motion CDp and low pass filtered by a horizontal low pass filter 1305 to smoothen transitions and passed through a coring circuit 1306 to eliminate possible noise interference. Finally, it is multiplied by gain, CGAIN (G2) via a multiplier 1307, and clipped by a saturation circuit 1308 to appropriate motion range to generate chroma motion CD.

The smoothness detectors 1104 and 1105 detect the presence of luminance residue and invalidate or override the output of respective chrominance motion detectors. The smoothness detectors 1104/1105 include both forward and backward diagonal contributions. The line signals of current and previous frames are diagonally filtered by forward diagonal high pass filters 1401/1402, and backward diagonal high pass filters 1403/1404 with common coefficients [−1 2 −1]/4. It receives the same input as the chrominance motion detector with three line signals from the current frame n: next line signal $C_{m+2,n}$, current line signal $C_{m,n}$, previous line signal $C_{m-2,n}$ and three line signals from the previous frame n−2: next line signal $C_{m+2,n-2}$ current line signal $C_{m,n-2}$, previous line signal $C_{m-1,n-2}$.

The line signals of current and previous frames are diagonally filtered by forward diagonal high pass filters 1401 and 1402, and backward diagonal high pass filters 1403 and 1404 with common coefficients [−1 2−1]/4. The input vector for forward diagonal contribution is [$C_{x-2,m+2}$ $C_{x,m}$ $C_{x+1,m-2}$] while the input vector for backward diagonal contribution is [$C_{x-1,m-2}$ $C_{x,m}$ $C_{x+1,m+2}$]. The forward diagonally filtered signals are subtracted by a subtractor 1405 and its magnitude is extracted by an absolute circuit 1407. The backward diagonally filtered signals are subtracted by a subtractor 1406 and its magnitude is extracted by an absolute circuit 1408. The max circuit 1409 selects the maximum of the forward or backward contribution to generate intermediate high frequency signal CFp. The signal is filtered by a horizontal low pass filter 1410 to smooth transitions and then cored by a coring circuit 1411 to eliminate small noise. A gain SmoGain (G3) is multiplied to the filtered output and signal is then clipped by a saturation circuit to generate high frequency signal CF. Alternatively, circuits 1410-1413 may be replaced by binary thresholding circuit to output 0 in presence of flat region and 1 in presence of luminance residue.

The phase motion detectors 1106/1107 complement the above detectors by detecting mainly chroma motion in the presence of luminance residue and high frequency luminance motion. Each receives the current frame signal, $C_{m,n}$, and a plurality of previous frame signals $C_{m,n-1}$, $C_{m,n-2}$, $C_{m,n-3}$ and $C_{m,n-4}$, via four chroma frame delay memories. Then each computes intermediate motion values YCDp via a circuit 1501 according to the equation (17) below.

$$YCD_p = \max\{|C_{m,n} - C_{m,n-1} + C_{m,n-2} - C_{m,n-3}|, |C_{m,n-1} - C_{m,n-2} + C_{m,n-3} - C_{m,n-4}|\} \quad (17)$$

The first component detects average chroma and luminance motion for plurality of frames from n to n−3 while the second component detects average chroma and luminance motion for plurality of frames from n−1 to n−4. As each component is asymmetrical about the temporal center, any scene change or chroma motion only occurring between second and third frame is not detected. Thus, a second component guarantees full motion detection.

The motion values may be smoothed by a horizontal low pass filter 1502 and cored through a coring circuit 1503. It may be scaled by gain PhaseGain (G4) via a multiplier 1504 and clipped by a saturation circuit 1505 to generate YC motion signal, YCD.

The same phase motion detectors 1106/1107 may be applied on the luminance component to generate YC motion values according to the equation (18) below.

$$YCD_p = \max\{|Y_{m,n} - Y_{m,n-1} + Y_{m,n-2} - Y_{m,n-3}|, |Y_{m,n-1} - Y_{m,n-2} + Y_{m,n-3} - Y_{m,n-4}|\} \quad (18)$$

In this case, the phase motion detector can complement detection of high frequency luminance that may not be present as luminance residue in chroma signal.

The chroma combiner 1108 combines results from independent detectors with U and V inputs. In the case of 4:2:2 sampling format, the samples of independent chroma is half that of luminance. The maximum chroma motion UD and VD is taken and duplicated corresponding to two luminance samples by a maxD circuit 1601 to give C2D. Similarly, the maximum high frequency signal UF and VF is taken and duplicated by a maxD circuit 1602 to give C2F and the maximum YC motion YUD and YVD is taken and duplicated by a maxD circuit 1603 to give YC2D. The duplicated signals have the same sample rate as luminance motion.

Signals C2D and YC2D pass through the max circuit 1604 and is further modified by the selector 1605. Output from max circuit 1604 is selected when a flat chroma region is detected or C2F=0 and signal YC2D is selected in presence of luminance residue or C2F≠0 to give signal CM. This compensates for undetected chroma motion by phase motion detector due to averaging effect in phase motion detector. The final motion value, K_motion, is derived as the maximum 1606 between the motion detected from luminance YM and motion detected from chrominance CM, clipped by the saturation circuit 1607, and further processed as the maximum in a 5-pixel horizontal window by the 5H-max circuit 1608.

Figure 10:
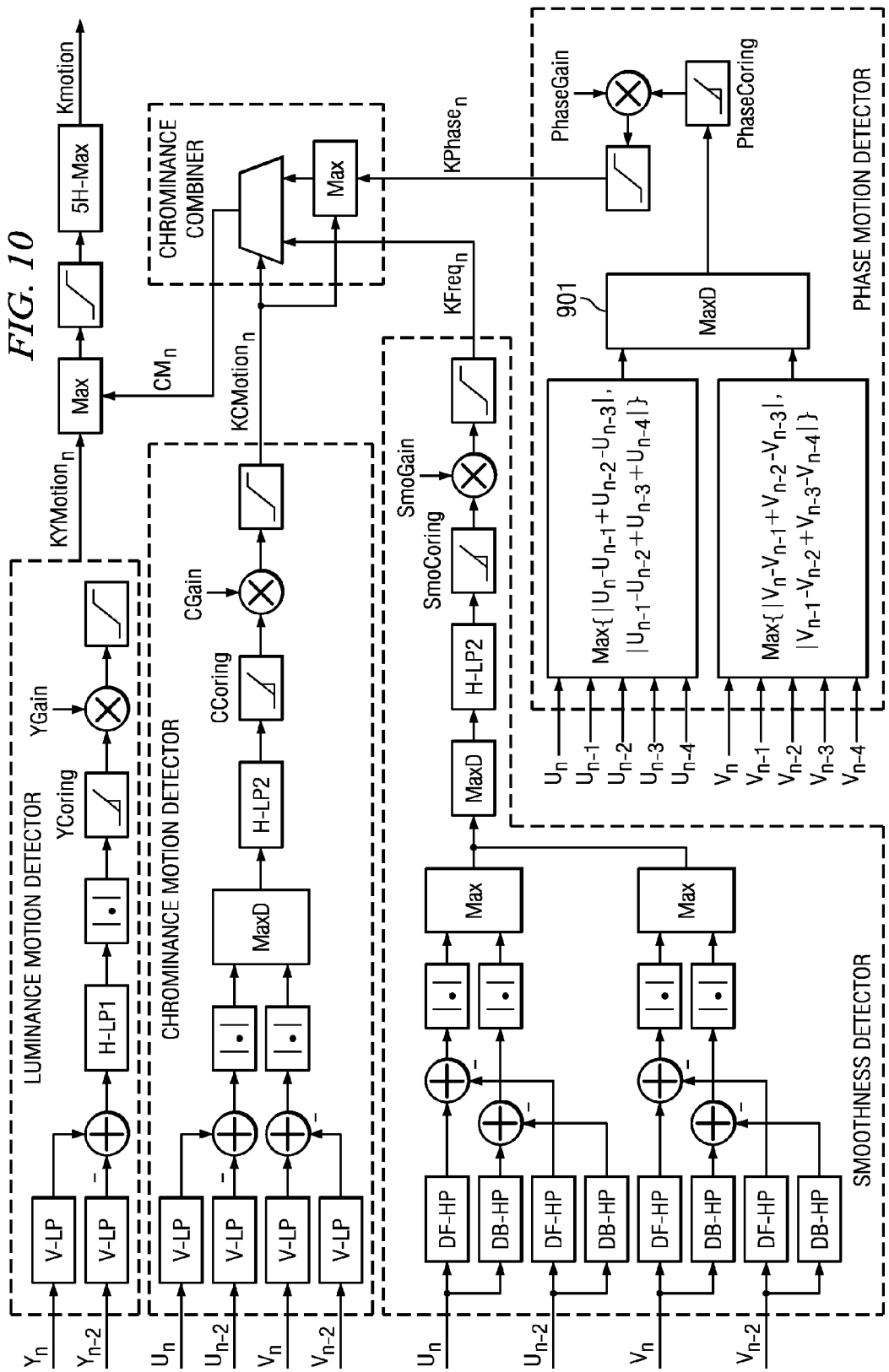
FIG. 10 shows an exemplary circuit of the motion detector for PAL standard in accordance with another embodiment of the present disclosure.

Referring to FIG. 10, there is provided an exemplary circuit of the motion detector for PAL standard in accordance with another embodiment of the present disclosure. Instead of combining the outputs of U and V detectors in the chroma combiner 1108, the intermediate output signals are combined before the filtering, coring, scaling and saturation processes. The detailed description is similar to the one for NTSC standard described above.

Figure 11:
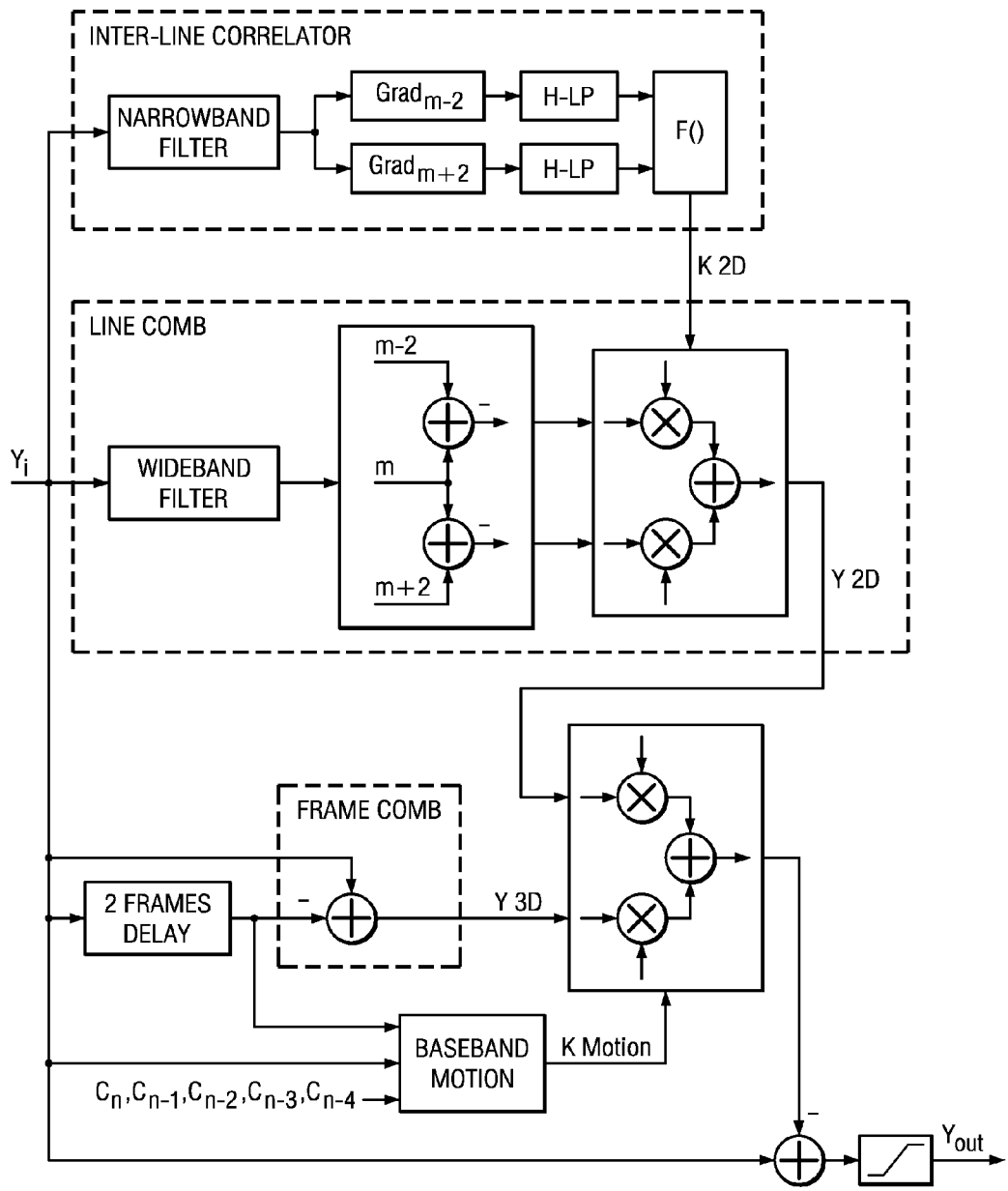
FIG. 11 shows an exemplary circuit of the cross luminance suppression circuit 2001 in the baseband YC separation circuitry 2000 as shown in FIG. 4 for PAL standard in accordance with one embodiment of the present disclosure.
Figure 12:
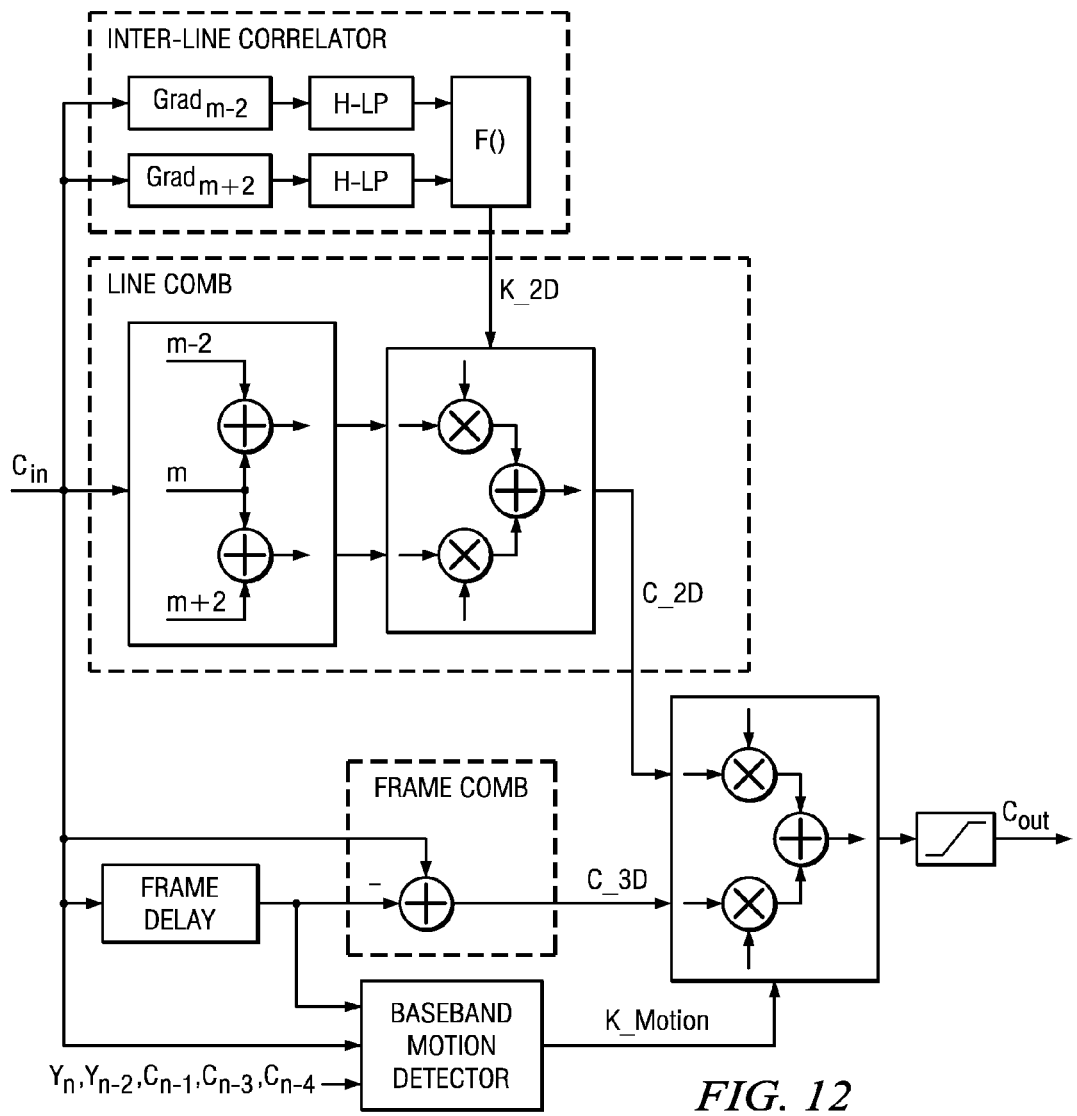
FIG. 12 shows an exemplary circuit of the cross chroma suppression circuits 2002/2003 in the baseband YC separation circuitry 2000 as shown in FIG. 4 for PAL standard in accordance with one embodiment of the present disclosure.
Figure 13:
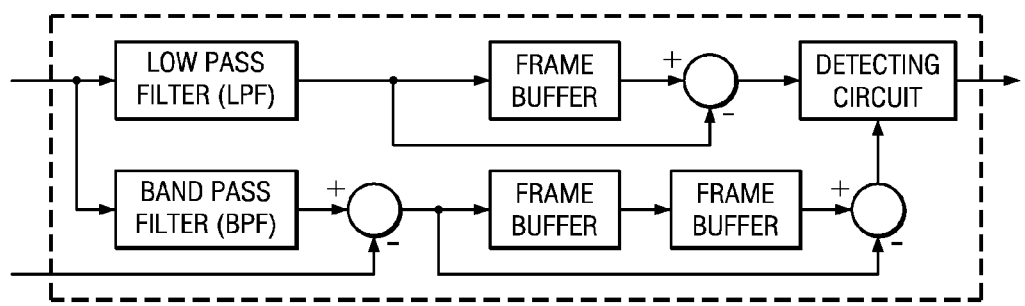
FIG. 13 shows a functional block diagram of a motion detector.

Referring to FIGS. 11 and 12, there are provided exemplary circuitries of the cross luminance suppression circuit 2001 and cross chroma suppression circuits 2002/2003 in the baseband YC separation circuitry 2000 as shown in FIG. 4 for PAL standard in accordance with one embodiment of the present disclosure. The technical differences between circuits for the PAL and NTSC lie in the use of next line signal m+2 instead of m+1 and previous line signal m−2 instead of m−1 for line comb and previous frame signal n−2 instead of n−1 and in the design of wideband and narrow band filters for chroma subcarrier at 4.43 MHz instead of 3.58 MHz. Since the operation of the circuitry remains the same, detailed description of cross luminance suppression circuit 2001 and cross chroma suppression circuits 2002 and 2003 for the PAL standard is not provided.

Generally, the disclosure is embedded in a baseband YC separation circuitry that reduces chroma residue in luminance component and luminance residue in chroma component. A preferred embodiment of the baseband YC separation circuitry comprises of a line comb filter that performs vertical filtering and a frame comb filter that performs temporal filtering. The disclosure is applied as a baseband motion detector to detect the motion between the candidate frames for temporal filtering. A mixer selects a high weight on the frame comb when the pixels are detected as stationary or selects a high weight on the line comb when pixels are detected as moving.

The inputs to the baseband circuitry may be processed by a front end digital decoder. In this case, the front end digital decoder receives the composite signal or s-video signal and decodes it into component Y, U and V signals for processing in baseband. The decoding process may include YC separation with a simple 2D comb filter for example a line comb, a 3D comb filter for example a line and frame comb controlled by a motion detector, a notch filter for the Y signal and bandpass filter for the C signal, or simply a demodulation circuitry.

Alternatively, the inputs may be processed by video decoder for example an MPEG 2 decoder. The inputs to the baseband motion detector may or may not be pre-processed by the baseband YC separation circuitry. Thus the disclosure is expected to consider the same variety of inputs as the baseband YC separation circuitry.

The disclosure operates such that the inputs are not temporally filtered in the presence of motion and temporally filtered in the absence of motion, generating clean Y, U and V signals with reduction of cross colour and dot crawl and ensuring minimally modified signals in the absence of such artifacts.

It can be applied to a chip or end consumer products like television, display sets, video CD player, DVD players or recorders and set-top-boxes with composite sources or sources that have composite conversion in at least one stage of processing prior to input. While the present disclosure has been described with reference to particular embodiments, it will be understood that the embodiments are illustrative and that the scope of the appended claims are not so limited. Alternative embodiments of this disclosure have been set forth by implication and will be apparent to those having ordinary skill in the art to which the present disclosure pertains. Such alternate embodiments are considered to be encompassed within the scope of one or more of the appended claims. Thus, the scope of this disclosure is described by the appended claims and is supported by the foregoing description. While this detailed description has set forth some embodiments of the present disclosure, the appended claims are sufficiently supported to cover and will cover other embodiments of this disclosure which differ from the described embodiments according to various modifications and improvements.

What is claimed is:

1. A baseband YC separation circuitry for video signal processing, the circuitry comprising:
   a cross luminance (Y) suppression circuit configured to detect luminance motion between a current frame and a previous frame and to suppress dot crawl artifacts or chroma residue present in a Y signal;
   a cross chroma (U) suppression circuit configured to detect U chroma motion between the current frame the previous frames and to suppress cross color artifacts or luminance residue present in U signals;

a cross chroma (V) suppression circuit configured to detect V chroma motion between the current frame the previous frames and to suppress cross color artifacts or luminance residue present in V signals; and a baseband motion detector configured to differentiate between moving and stationary pixels such that an optimum comb filter can be selected to maximize effectiveness of YC separation, wherein the baseband YC separation circuitry is configured to receive $Y_{in}$, $U_{in}$ and $V_{in}$ input signals separately and to output clean luminance signals $Y_{out}$, $U_{out}$ and $V_{out}$.

2. A baseband YC separation circuitry, for video signal processing, the circuitry comprising:

a cross luminance (Y) suppression circuit configured to suppress dot crawl artifacts or chroma residue present in a Y signal;

a cross chroma (U) suppression circuit configured to suppress cross color artifacts or luminance residue present in U signals;

a cross chroma (V) suppression circuit configured to suppress cross color artifacts or luminance residue present in V signals; and a baseband motion detector configured to differentiate between moving and stationary pixels such that an optimum comb filter can be selected to maximize effectiveness of YC separation, wherein the baseband YC separation circuitry is configured to receive $Y_{in}$, $U_{in}$ and $V_{in}$ input signals separately and to output clean luminance signals $Y_{out}$, $U_{out}$ and $V_{out}$, wherein the cross luminance suppression circuit comprises an inter-line correlator configured to detect a relative chroma correlation between a current line and a next line and the current line and a previous line, such that a line comb does not filter across contrasting color regions, the inter-line correlator comprising:

a narrowband filter configured to isolate a sub-band of a YC interleave frequency band;

at least one gradient circuit coupled to the narrowband filter and configured to compute gradients of the current and next lines, $G_{x,m,m+1}$, and of the current and previous lines, $G_{x,m,m-1}$;

at least one horizontal low pass filter coupled to the gradient circuit and configured to low pass filter for continuity; and a function circuit coupled to the horizontal low pass filter and configured to generate a signal for a weight K_2D between the current and previous lines;

a line comb configured to extract chroma residues from the Y signal, the line comb comprising:

a wideband filter configured to filter out low and high frequency signals and to retain only a frequency band with interleave Y and C signal;

at least one subtractor configured to compute inter-line differences; and a mixer corresponding to the weight K_2D signal from the inter-line correlator and configured to mix inter-line differences;

a frame comb configured to subtract a previous frame signal $Y_{m,n-1}$ from a current frame signal $Y_{m,n}$ using a subtractor to generate frame comb output;

a mixer circuit configured to extract a residual chroma signal using a motion value, K_motion, from the baseband motion detector; and a saturation circuit configured to clip an output of the mixer circuit to defined pixel range so as to generate the clean luminance signal.

3. A baseband YC separation circuitry, for video signal processing, the circuitry comprising:

a cross luminance suppression circuit configured to suppress dot crawl artifacts or chroma residue present in a Y signal;

a cross chroma (U) suppression circuit configured to suppress cross color artifacts or luminance residue present in U signals;

a cross chroma (V) suppression circuit configured to suppress cross color artifacts or luminance residue present in V signals; and a baseband motion detector configured to differentiate between moving and stationary pixels such that an optimum comb filter can be selected to maximize effectiveness of YC separation, wherein the baseband YC separation circuitry is configured to receive $Y_{in}$, $U_{in}$ and $V_{in}$ input signals separately and to output clean luminance signals $Y_{out}$, $U_{out}$ and $V_{out}$, wherein the cross chroma suppression circuits comprise an inter-line correlator configured to detect a relative chroma correlation between the current and next lines and the current and previous lines, the inter-line correlator comprising:

at least one gradient circuit configured to compute gradients of the current and next lines, $G_{x,m,m+1}$, and of the current and previous lines, $G_{x,m,m-1}$, at least one horizontal low pass filter configured to subsequently filter the gradients; and a function circuit configured to generate a weight signal K_2D between the current and previous chroma lines;

a chroma line comb configured to remove redundant luminance residue from the $U_{in}$ or $V_{in}$ signals, the chroma line comb comprising at least one adder configured to average inter-line differences and a mixer corresponding to the K_2D signal from the interline correlator and configured to mix line comb signal differences;

a frame comb configured to add a previous frame signal $C_{m,n-1}$ to a current frame signal $C_{m,n}$ using an adder to generate a frame comb output C_3D;

a mixer circuit configured to use a motion value, K_motion, from the baseband motion detector to generate a final 3D value, $C_{out}$; and a saturation circuit configured to clip the final 3D value to a valid pixel range and to output the final 3D value to at least one video processing unit.

4. A baseband YC separation circuitry, for video signal processing, the circuitry comprising:

a cross luminance (Y) suppression circuit configured to suppress dot crawl artifacts or chroma residue present in a Y signal;

a cross chroma (U) suppression circuit configured to suppress cross color artifacts or luminance residue present in U signals;

a cross chroma (V) suppression circuit configured to suppress cross color artifacts or luminance residue present in V signals; and a baseband motion detector configured to differentiate between moving and stationary pixels such that an optimum comb filter can be selected to maximize effectiveness of YC separation, wherein the baseband YC separation circuitry is configured to receive $Y_{in}$, $U_{in}$ and $V_{in}$ input signals separately and to output clean luminance signals $Y_{out}$, $U_{out}$ and $V_{out}$, wherein the baseband motion detector comprises:
a luminance motion detector configured to detect a low frequency luminance motion between a current frame and a previous frame;
at least two chrominance motion detector configured to detect U and V chroma motions between the current frame and the previous frame;
a smoothness detector configured to detect presence of luminance residue on U and V chroma components in the current frame and the previous frame; and
a phase motion detector configured to detect luminance and chroma motion between the current frame and the plurality of previous frames.

5. The baseband YC separation circuitry of claim 1, wherein the baseband YC separation circuitry comprises a 3D comb filter using a mix of frame comb filtering and line comb filtering controlled by a motion detector.

6. The baseband YC separation circuitry of claim 1, wherein the baseband YC separation circuitry comprises a 2D comb filter with a 3-line comb filter controlled by an inter-line correlator.

7. The baseband YC separation circuitry of claim 1, wherein the baseband YC separation circuitry comprises a set of complementary or non-complementary filters around a chroma subcarrier frequency with a band-stop or notch filter for a Y output and a band-pass filter for a C output.

8. The baseband YC separation circuitry of claim 1, wherein the baseband YC separation, circuitry is configured to operate independent of front-end separation circuitry.

9. A chip comprising a computer executable medium embedded therein, the computer executable medium containing instructions that, when executed, implement a video signal processing system, the system comprising:
a front end digital decoder configured to decode a composite input signals to generate component Y, U and V signals; and
a baseband YC separation component for video signal processing, the component comprising:
a cross luminance (Y) suppression module configured to detect luminance motion between a current frame and a previous frame and to suppress dot crawl artifacts or chroma residue present in a Y signal;
a cross chroma (U) suppression module configured to detect U chroma motion between the current frame the previous frames and to suppress cross color artifacts or luminance residue present in U signals;
a cross chroma (V) suppression module configured to detect V chroma motion between the current frame the previous frames and to suppress cross color artifacts or luminance residue present in V signals; and
a baseband motion detector configured to differentiate between moving and stationary pixels such that an optimum comb filter can be selected to maximize effectiveness of YC separation,
wherein the baseband. YC separation component is configured to receive $Y_{in}$, $U_{in}$ and $V_{in}$, input signals separately and to output clean luminance signals $Y_{out}$, $U_{out}$ and $V_{out}$.

10. The chip of claim 9, wherein the cross luminance suppression module comprises:
an inter-line correlator configured to detect a relative chroma correlation between a current line and a next line and the current line and a previous line, such that a line comb does not filter across contrasting color regions, the inter-line correlator comprising:
a narrowband filter configured to isolate a sub-band of a YC interleave frequency band;
at least one gradient component coupled to the narrowband filter and configured to compute gradients of the current and next lines, $G_{x,m,m+1}$, and of the current and previous lines, $G_{x,m,m-1}$;
at least one horizontal low pass filter coupled to the gradient circuit and configured to low pass filter for continuity; and
a function component coupled to the horizontal low pass filter and configured to generate a signal for a weight K__2D between the current and previous lines;
a line comb filter configured to extract chroma residues from the Y signal, the line comb filter comprising:
a wideband filter configured to filter out low and high frequency signals and to retain only a frequency band with interleave Y and C signal;
at least one subtractor configured to compute inter-line differences; and
a mixer corresponding to the weight K__2D signal from the inter-line correlator and configured to mix inter-line differences;
a frame comb configured to subtract a previous frame signal $Y_{m,n-1}$ from a current frame signal $Y_{m,n}$ using a subtractor to generate frame comb output;
a mixer configured to extract a residual chroma signal using a motion value, K_motion, from the baseband motion detector; and
a saturation component configured to clip an output of the mixer circuit to defined pixel range so as to generate the clean luminance signal.

11. The chip of claim 9, wherein the cross chroma suppression modules each comprise:
an inter-line correlator configured to detect a relative chroma correlation between the current and next lines and the current and previous lines, the inter-line correlator comprising:
at least one gradient component configured to compute gradients of the current and next lines, $G_{x,m,m+1}$, and of the current and previous lines, $G_{x,m,m-1}$;
at least one horizontal low pass filter configured to subsequently filter the gradients; and
a function component configured to generate a weight signal K__2D between the current and previous chroma lines;
a chroma line comb configured to remove redundant luminance residue from the $U_{in}$ or $V_{in}$ signals, the chroma line comb comprising at least one adder configured to average inter-line differences and a mixer corresponding to the K__2D signal from the interline correlator and configured to mix line comb signal differences;
a frame comb configured to add a previous frame signal $C_{m,n-1}$ to a current frame signal $C_{m,n}$ using an adder to generate a frame comb output C__3D;
a mixer configured to use a motion value, K_motion, from the baseband motion detector to generate a final 3D value, $C_{out}$; and
a saturation component configured to clip the final 3D value to a valid pixel range and to output the final 3D value to at least one video processing system.

12. The chip of claim 9, wherein the baseband motion detector comprises:
a luminance motion detector configured to detect a low frequency luminance motion between a current frame and a previous frame;
at least two chrominance motion detector configured to detect U and V chroma motions between the current frame and the previous frame;

a smoothness detector configured to detect presence of luminance residue on U and V chroma components in the current frame and the previous frame; and a phase motion detector configured to detect luminance and chroma motion between the current frame and the plurality of previous frames.

13. The chip of claim 9, wherein the baseband YC separation component comprises a 3D comb filter using a mix of frame comb filtering and line comb filtering controlled by a motion detector.

14. The chip of claim 9, wherein the baseband YC separation component comprises a 2D comb filter with a 3-line comb filter controlled by an inter-line correlator.

15. The chip of claim 9, wherein the baseband YC separation component comprises a set of complementary or non-complementary filters around a chroma subcarrier frequency with a band-stop or notch filter for a Y output and a band-pass filter for a C output.

16. A method of video signal processing using a baseband YC separation circuitry, the method comprising:
receiving $Y_{in}$, $U_{in}$ and $V_{in}$ input signals separately;
detecting luminance motion between a current frame and a previous frame to suppress dot crawl artifacts or chroma residue present in a Y signal using a cross luminance (Y) suppression circuit;
detecting U chroma motion between the current frame the previous frames to suppress cross color artifacts or luminance residue present in U signals using a cross chroma (U) suppression circuit;
detecting V chroma motion between the current frame the previous frames to suppress cross colour artifacts or luminance residue present in V signals using a cross chroma (V) suppression circuit;
differentiating between moving and stationary pixels such that an optimum comb filter can be selected to maximize effectiveness of YC separation using a baseband motion detector; and
outputting clean luminance signals $Y_{out}$, $U_{out}$ and $V_{out}$.

17. The method of video signal processing of claim 16, further comprising:
detecting a relative chroma correlation between a current line and a next line and the current line and a previous line, such that a line comb does not filter across contrasting color regions by:
isolating, with a narrowband filter, a sub-band of a YC interleave frequency band,
computing gradients of the current and next lines, $G_{x,m,m+1}$, and of the current and previous lines, $G_{x,m,m-1}$,
low pass filtering the computed gradients for continuity, and generating a signal for a weight K_2D between the current and previous lines;
extracting chroma residues from the Y signal by:
filtering, with a wideband filter, low and high frequency signals to retain only a frequency band with interleave Y and C signal,
computing inter-line differences, and
mixing inter-line difference based on the weight K_2D signal;
subtracting a previous frame signal from a current frame signal $Y_{in}$, using a subtractor to generate frame comb output;
extracting a residual chroma signal using a motion value, K_motion; and
clipping an output of mixing the inter-line difference to defined pixel range so as to generate the clean luminance signal.

18. The method of video signal processing of claim 16, further comprising:
detecting a relative chroma correlation between the current and next lines and the current and previous lines by:
computing gradients of the current and next lines, $G_{x,m,m+1}$, and of the current and previous lines, $G_{x,m,m-1}$
subsequently filtering the gradients, and
generating a weight signal K_2D between the current and previous chroma lines;
removing redundant luminance residue from the $U_{in}$ or $V_{in}$ signals using at least one adder configured to average inter-line differences and a mixer corresponding to the K_2D signal and configured to mix line comb signal differences;
adding a previous frame signal $C_{m,n-1}$ to a current frame signal $C_{m,n}$ using an adder to generate a frame comb output C_3D;
using a motion value, K_motion, to generate a final 3D value, $C_{out}$; a
clipping the final 3D value to a valid pixel range and outputting the final 3D value to at least one video processing unit.

19. The method of video signal processing of claim 16, further comprising:
detecting a low frequency luminance motion between a current frame and a previous frame;
detecting U and V chroma motions between the current frame and the previous frame;
detecting presence of luminance residue on U and V chroma components in the current frame and the previous frame; and
detecting luminance and chroma motion between the current frame and the plurality of previous frames.

20. The method of video signal processing of claim 16, further comprising:
using a mix of frame comb filtering and line comb filtering controlled by a motion detector.

* * * * *